United States Patent
Orth et al.

[11] 3,810,488
[45] May 14, 1974

[54] PRESSURE REGULATOR VALVE

[75] Inventors: Charles D. Orth, Cedarburg;
Charles F. Treder, Brookfield;
Marcel P. Griffoul, West Allis, all of Wis.

[73] Assignee: Controls Company of America, Schiller Park, Ill.

[22] Filed: Nov. 20, 1972

[21] Appl. No.: 308,029

[52] U.S. Cl. .............................. 137/489.3, 62/217
[51] Int. Cl. ............................................. F16k 17/10
[58] Field of Search .................... 137/489.3; 62/217

[56] References Cited
UNITED STATES PATENTS
3,614,966   10/1971   Orth ............................. 137/489.3

*Primary Examiner*—Meyer Perlin
*Attorney, Agent, or Firm*—Michael, Best & Friedrich

[57] ABSTRACT

The interior of the bellows is sealed at atmospheric pressure so the pressure on the outside of the bellows is resisted by the atmospheric pressure within the bellows as well as by the spring. When the pressure on the outside of the bellows (which is evaporator pressure in a refrigeration system) exceeds a predetermined amount, the bellows tends to collapse and the head of the bellows pulls away from the actuating pin and allows the spring acting on the pilot valve to open the pilot valve whereupon the pressure to the right of the head of the piston is reduced, allowing the piston to move to the right against the return spring force and thus open the outlet by moving the end of the piston wall past the slot in the stationary sleeve. When the pressure falls below the desired amount, the bellows expands and moves the head of the bellows against the actuating pin to close the pilot valve. Flow through the bleed hole in the end of the piston to the pilot valve chamber rapidly raises the pressure therein so that the return spring can move the piston to close the outlet. Even with the outlet closed, the small port in the piston sleeve allows enough refrigerant flow to insure adequate flow to the compressor to keep the compressor lubricated. The bleed hole in the piston head is sized to require substantial opening of the pilot valve which, therefore, minimizes false opening of the main valve. Controlled leakage to the groove at the pilot end of the piston blocks flow from the pilot valve chamber to the main outlet and stabilizes valve operation.

4 Claims, 2 Drawing Figures

PATENTED MAY 14 1974 3,810,488

PRESSURE REGULATOR VALVE

BACKGROUND OF THE INVENTION

Orth U.S. Pat. No. 3,614,966 improved upon the art by simpler construction and smaller size. Experience with that design showed some problems with performance. Operating pressure varied with the effective leakage into the pilot chamber. Entrained metal chips and dirt could cause malfunction. Pressure pulsations could cause resonance of the moving parts.

SUMMARY OF THE INVENTION

By providing a fixed bleed hole of sufficient size into the pilot chamber, the pilot valve must open substantially and positively to effect opening of the main valve. This prevents false opening of the main valve as sometimes occurred in the prior design. This stability is augmented by preventing leakage from the pilot chamber back to the main opening by the simple expedient of "injecting" inlet pressure around the piston valve adjacent the pilot chamber. These features also stabilize the valve closing. Critical areas are now protected from dirt and chips. The friction between the piston and cylinder is controlled within the desired range. Those parts which of necessity are exposed to entrained dirt and chips are designed to insure flushing the foreign material rather than becoming wedged between the moving parts.

This valve works better and performance is comparable from valve to valve. Tolerances and calibration procedures are reasonable.

DESCRIPTION OF PREFERRED EMBODIMENT

Figure 1:
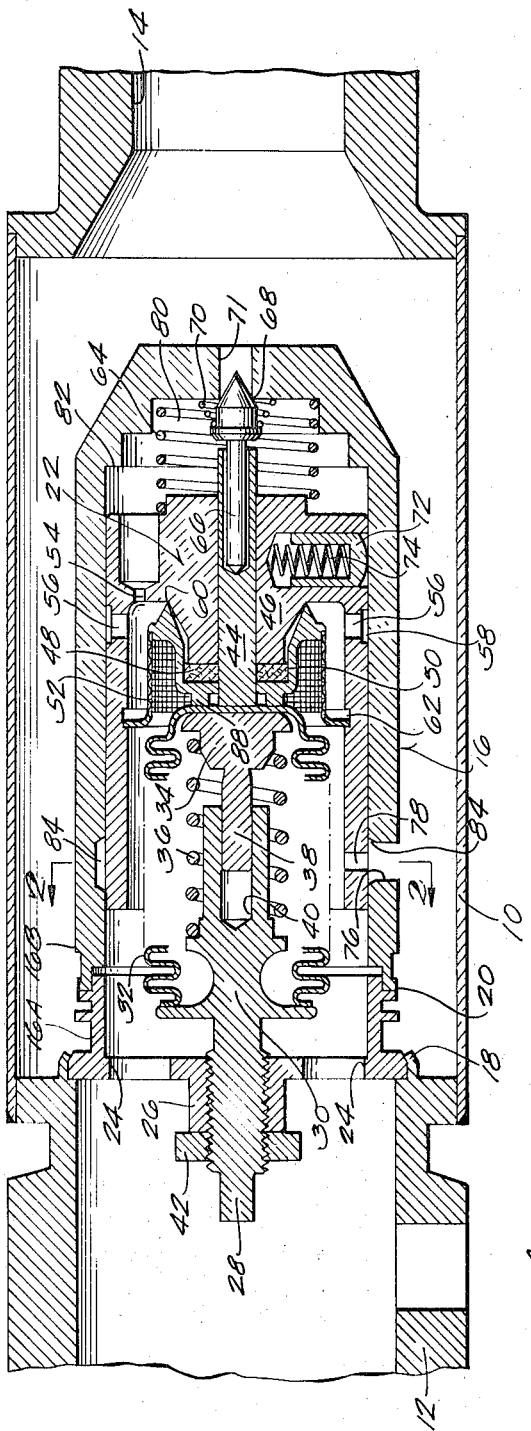
FIG. 1 is a section through the valve.
Figure 2:
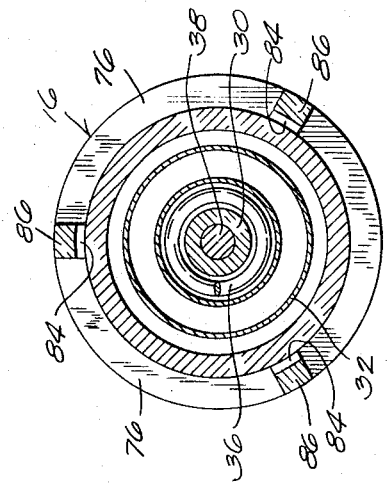
FIG. 2 is a vertical section on line 2—2 in FIG. 1.

FIG. 1 is a cross section through the pilot operated evaporator pressure valve enclosed in its own housing for use as a separate unit in an installation in the compressor suction line. If the valve is to be used within a compressor, the outer housing shown is not necessary since this becomes a cavity in the compressor housing.

The evaporator pressure regulator valve is enclosed in a housing having a central barrel 10 with inlet 12 and outlet 14 applied respectively to the left and right ends of the barrel. The evaporator pressure regulator includes a cylinder or sleeve 16 made up of adapter 16A and cylinder 16B and adapted to seat on the cooperating internal shoulder in inlet 12 and be held thereagainst by means of staking 18. The same sort of mounting can be used in placing the evaporator pressure regulator valve in a suitable cavity in a compressor housing.

Adapter 16A is welded to 16B at 20, this construction facilitating mounting of parts inside and to complete the assembly of what essentially amounts to a single cylinder 16 in which the piston 22 and the various other parts are mounted. Adapter 16A is provided with multiple inlet ports 24 and has a central internally threaded boss 26 through which the threaded stem 28 of the bellows support 30 projects. The bellows support has bellows 32 secured thereto with the other end of the bellows passing over pad 34 which serves as a seat for spring 36 inside the bellows. The pad has a guide stem 38 which is received in the blind hole 40 in the bellows support member. The space inside the bellows is at atmospheric pressure when it is sealed. Thus the pressure on the outside of the bellows is resisted by the atmospheric pressure within the bellows and by spring 36 and the spring effect of the bellows itself. The degree of compression of spring 36 is determined by turning the threaded stem 28 relative to the boss 26 and at the conclusion of the adjustment (which adjustment will determine the response pressure) the threaded boss 26 is crimped into the threads and the lock nut 42 is turned down tight. The bellows assembly acts against the head of actuating pin 44 which passes through the head 46 of the piston 22. A felt wiper 48 keeps the pin 44 free of dirt and is retained in position by member 50 which supports a filter screen 52 (20 micron) which prevents dirt from migrating to bleed hole 54 or the radial ports 56 leading to groove 58 on the outside of the piston. Member 52 seats against the piston head at 60 and is snapped into the internal groove 62. The piston is urged to the left by spring 64. The pin 44 supports the stem 66 of pilot valve 68. Spring 70 urges the valve into pin 44. Pilot valve 68 controls flow through port 71. Friction of the piston in the cylinder is controlled by the plastic friction button 72 spring loaded against the interior of the cylinder 16 by a low rate spring 74 — the low rate giving consistent friction from valve to valve in production.

In the position shown, the main valve is closed. . . . the skirt of piston 22 covers the slot 76 in the wall of cylinder 16. A limited amount of flow can take place through hole 78 in the piston skirt aligned with the slot 76 as shown. This insures adequate flow to the compressor to lubricate the compressor and prevent overheating of the compressor. Under the illustrated conditions, the pressure in pilot chamber 80 between the piston head and the end of the cylinder is at the same pressure as the inlet by reason of the fact that flow can occur through the bleed hole 54. It will be noted that flow can also take place through the radial ports 56 into groove 58. This establishes inlet pressure near the piston head and prevents any tendency of refrigerant in the pilot chamber 80 to flow back along the length of the piston to the outlet ports 76. As the inlet pressure builds up, it tends to collapse the bellows 32 which will cause the pad to move to the left which will allow pin 44 to also move to the left under the influence of spring 70. This, then, permits flow from the pilot chamber through port 71. If the opening is sufficient (greater than that permitted by the bleed 54) then the pressure drops in the pilot chamber causing a pressure differential to exist across the piston head. This moves the piston head to the right against the force of spring 64. Movement of the piston to the right is limited by its engagement with piston stop 82. Movement of the piston does not affect the position of the pilot valve or the bellows. The piston more or less slides along the cylinder relative to the cylinder and pin 44. As the piston moves to the right, the piston skirt uncovers the slots 76 and allows flow to occur through the main valve. If the evaporator pressure drops too low, the bellows 32 again expands, closes the pilot valve, and the pressure in the pilot chamber 80 builds up to allow the spring 64 to push the piston to the left and close off flow. The proper pressure is maintained in the pilot chamber by reason of adequate bleed through bleed 54 coupled with the fact that inlet pressure has been established in groove 58 surrounding the piston head to eliminate any tendency of pilot chamber pressure to bleed back along the piston. This, therefore, establishes the proper pressure in the pilot chamber and gives uniform results from valve to valve. The provision of a known bleed hole insures against false opening and closing of the valve.

It will be noted that a groove 84 is provided leading into the slots 76. This helps flush dirt through the slots and prevents entrapment under the webs 86. Experience shows this feature to be quite important in field service.

Movement of the piston to the left is limited by engagement of the annular projection 88, which is a part of member 50, coming into contact with the right end of the bellows. At this point, since the pressures across the piston head are equal, it is simply a matter of spring 64 holding the piston against the head of the bellows, the bellows spring itself being stronger than spring 64.

Operation of the compressor can cause pressure pulsations in the refrigerant. In the prior design this sometimes resulted in the moving part moving in resonance with the pulsations. This, of course, had an undesirable effect on performance. Therefore, the weight of the piston in this design has been increased to result in a lower natural frequency of vibration than the frequency of pressure pulsation occasioned by the compressor. This avoids resonance of the piston.

We claim:

1. A pilot operated valve assembly comprising a cylindrical housing,
   a piston in the housing dividing it into inlet and pilot chambers,
   a pilot valve in the housing end wall,
   a sealed bellows fixed on the other end wall and projecting towards the pilot valve,
   an actuating pin extending between the bellows and the valve and passing through the piston head,
   a spring inside the bellows urging the free end of the bellows towards the valve with a force which, when combined with the internal pressure in the bellows and the force exerted by the bellows, acts to seat the pilot valve when the pressure outside the bellows is below a predetermined value,
   a bleed hole through the piston head providing flow between the two chambers at a rate less than the flow rate through the pilot valve when the pilot valve is open a substantial amount and sufficient to equalize the pressures in the two chambers when the pilot valve is closed,
   a groove around the piston near the piston head,
   ports leading from the inlet chamber to said groove so inlet pressure will prevail at the groove and prevent flow from the pilot chamber between the piston and housing,
   a filter screen between the inlet chamber and the bleed hole and said ports to keep foreign matter therefrom,
   an inlet in said other end wall of the housing,
   an outlet in the side wall of the housing,
   a second spring acting on the piston to move it to a position in which it closes off the outlet when the pilot valve is closed and the chamber pressures are equalized but being overcome by the pressure differential across the piston head when the pilot valve is opened by reason of pressure in the inlet chamber exceeding said predetermined value and causing the bellows to collapse,
   said piston moving to uncover the outlet when the second spring has been overcome.

2. A valve assembly according to claim 1 in which the weight of the piston is great enough to give the piston and the return spring a natural frequency of vibration below compressor induced pulsations in a refrigeration system and thereby avoid piston movement in resonance with such pulsations.

3. A valve assembly according to claim 1, including a friction member mounted in a cavity in the side of the piston,
   a low rate spring urging the friction member into engagement with the housing to impose a frictional resistance to movement.

4. A valve assembly according to claim 1, in which the outlet comprises plural circumferential slots with connecting webs between the slots, said webs being undercut to permit flushing entrained dirt from the skirt of the piston.

* * * * *